(12) United States Patent
Christmas et al.

(10) Patent No.: US 8,085,453 B2
(45) Date of Patent: Dec. 27, 2011

(54) PHASE RETRIEVAL AND PHASE HOLOGRAM SYNTHESIS

(75) Inventors: Jamieson Christmas, Milton (GB); William Alden Crossland, Harlow (GB)

(73) Assignee: Cambridge Enterprise Limited, Cambridge (GB)

( * ) Notice: Subject to any disclaimer, the term of this patent is extended or adjusted under 35 U.S.C. 154(b) by 527 days.

(21) Appl. No.: 12/291,012

(22) Filed: Nov. 5, 2008

(65) Prior Publication Data

US 2009/0128875 A1     May 21, 2009

Related U.S. Application Data

(63) Continuation of application No. PCT/EP2007/003973, filed on May 4, 2007.

(30) Foreign Application Priority Data

May 11, 2006 (GB) .................... 0609365.2

(51) Int. Cl.
*G03H 1/08* (2006.01)
(52) U.S. Cl. .......................................... 359/9
(58) Field of Classification Search .............. 359/9, 29
See application file for complete search history.

(56) References Cited

U.S. PATENT DOCUMENTS

| 6,961,159 B2 | 11/2005 | Yamauchi et al. | |
| 2002/0060831 A1* | 5/2002 | Gerchberg | 359/237 |
| 2007/0024999 A1* | 2/2007 | Crossland et al. | 359/859 |

FOREIGN PATENT DOCUMENTS

| EP | 1498766 A1 | 1/2005 |
| WO | WO 2005/059881 A | 6/2005 |

OTHER PUBLICATIONS

Dufresne, E.R., et al., "Computer-generated holographic optical tweezer arrays," Review of Scientific Instruments, *American Institute of Physics*, 72(3): (Mar. 2001).
Chang, M-P., et al., "The Modified Input-Output Algorithm for the Synthesis of Computer-Generated Holograms," *Optik*, 95(4): 155-160, Wissenschaftliche Verlag GMBH, (Feb. 1, 1994).
Curtis, J.E., et al., "Dynamic holographic optical tweezers," *Optics Communications*, 207(1-6): 169-175, North-Holland Publishing Co., (Amsterdam, Netherlands) (Jun. 15, 2002).
International Search Report, PCT/EP2007/003973, (Oct. 5, 2007).
Great Britain Search Report, GB0609365.2, (Sep. 20, 2007).
Zheng, D-X., et al., "Wave field reconstruction from a hologram sequence," *Optics Communications*: 249, pp. 73-77, (Elsevier, B.V.), (Jan. 14, 2005).
Liu, J.S., et al., "Symmetrical iterative Fourier-transform algorithm using both phase and amplitude freedoms," *Optics Communications*: 267, (Elsevier B.V.), pp. 347-355, (Jun. 15, 2006).
Golub, M.A., et al., "Phase coding in iterative synthesis of computer-generated holograms," *Optics & Laser Technology*, 27(4): 223-228 (Aug. 1995).

* cited by examiner

*Primary Examiner* — Alessandro Amari
(74) *Attorney, Agent, or Firm* — Hamilton, Brook, Smith & Reynolds, P.C.

(57) ABSTRACT

A method of retrieving phase information from input intensity information, representative of a target image, in which a Fourier transform is performed on data and the result used in forming a phase estimate, the phase estimate being inverse Fourier transformed, thereby producing magnitude and phase replay, and wherein not only is the phase reply component but also data derived from the magnitude replay component, iteratively fed back.

38 Claims, 5 Drawing Sheets

PHASE RETRIEVAL AND PHASE HOLOGRAM SYNTHESIS

RELATED APPLICATIONS

This application is a Continuation of International Application No. PCT/EP2007/003973, which designated the United States and was filed on May 4, 2007, published in English, which claims priority under 35 U.S.C. §119 or 365 to Great Britain, Application No. 0609365.2, filed May 11, 2006.

The entire teachings of the above applications are incorporated herein by reference.

SUMMARY OF THE INVENTION

The present invention relates to a method of phase retrieval, a method for real-time holographic projection and an apparatus for producing real-time holograms.

A number of algorithms, many based on the Gerchberg Saxton algorithm, use Fourier transforms to derive phase information from a target image. Such phase information, when implemented on a spatial light modulator (SLM) or the like, can simulate physical kinoforms so that when the SLM is illuminated by collimated laser light, a replay field corresponding generally to the target image is provided.

A number of other algorithms exist for providing phase information.

The Gerchberg Saxton algorithm and derivatives thereof are often much faster than the other "non-Fourier transform" algorithms. However, the iterative Gerchberg Saxton algorithm lacks the quality of the other algorithms, such as direct binary search algorithms, especially where relatively low numbers of iterations have been performed.

The Gerchberg Saxton algorithm considers the phase retrieval problem when intensity cross-sections of a light beam, $I_A(x,y)$ and $I_B(x,y)$, in the planes A and B respectively, are known and $I_A(x,y)$ and $I_B(x,y)$ are related by a single Fourier transform. With the given intensity cross-sections, an approximation to the phase distribution in the planes A and B, $\Phi_A(x,y)$ and $\Phi_B(x,y)$ respectively, can be found by this method. The Gerchberg-Saxton algorithm finds good solutions to this problem by following an iterative process.

The Gerchberg-Saxton algorithm iteratively applies spatial and spectral constraints while repeatedly transferring a data set (amplitude and phase), representative of $I_A(x,y)$ and $I_B(x,y)$, between the spatial domain and the Fourier (spectral) domain. The spatial and spectral constraints are $I_A(x,y)$ and $I_B(x,y)$ respectively. The constraints in either the spatial or spectral domain are imposed upon the amplitude of the data set and the phase information converge through a series of iterations.

Either or both constraints may be the phase information and, in this case, it would be the amplitude information that is desired.

It is also known that the Gerchberg-Saxton algorithm may begin in either the spatial domain or the Fourier domain.

It is desirable to provide a method of phase retrieval which can be implemented in a way that provides convergence more rapidly than the prior art.

BRIEF DESCRIPTION OF THE DRAWINGS

The present invention will be better understood after reading the following description in conjunction with the drawings, in which.

DETAILED DESCRIPTION OF THE INVENTION

Figure 1:
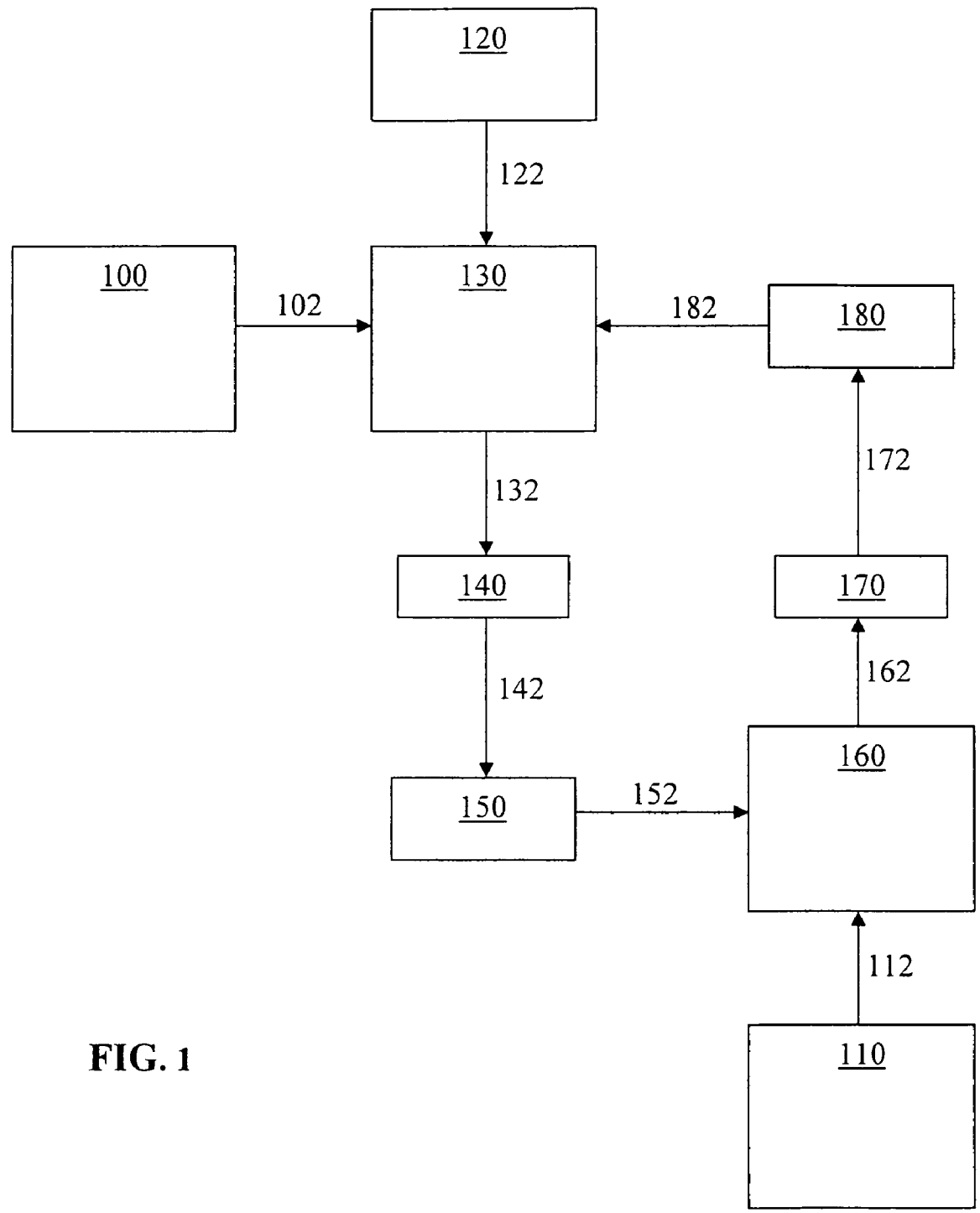
FIG. 1 shows a diagram of the Gerchberg-Saxton algorithm.

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating embodiments of the present invention.

Referring to FIG. 1, the Gerchberg-Saxton algorithm establishes a discrete phase distribution at an image plane 100 and a corresponding diffraction (Fourier) plane 110 from known discrete amplitude distributions at the image and diffraction planes respectively. The image plane and diffraction plane are related through a single Fourier transform since the latter is the far-field diffraction pattern of the former. With both the amplitude and phase information, full wavefront reconstruction is achieved at both locations.

The method iterates a series of operations and has an input and an output. A data set having a plurality of elements, each element containing amplitude and phase information, is received at the input. After completing an iteration, the method outputs a new approximation of the received data set, and this approximation forms the basis for the input to the next iteration. It is intended that each iteration is a better approximation than the last iteration.

Referring to FIG. 1, for an $n^{th}$ iteration, phase information 182 from the previous (n−1) iteration is multiplied in multiplication block 130 by the spatially corresponding image plane amplitudes 102 from the target image 100. The resultant data set 132 is input to processing block 140 which applies a fast Fourier transform (FFT) to provide a second data set 142 in the frequency domain. Processing block 150 extracts the phase information 152 resulting from the FFT. Phase information 152 is then multiplied in processing block 160 by the stored diffraction plane amplitudes 112 (which are by definition in the frequency domain) to provide a third data set 162; this is an estimate of the complex diffraction pattern (it now has phase as well as amplitude). The third data set 162 is inverse Fourier transformed by processing block 170 into a fourth data set 172 in the spatial domain. The phase information 182 of data set 172 is extracted by processing block 180. The data set with phase information 182 and amplitude information 102 provides the complex input to the second iteration. When the phase distributions converge sufficiently, the algorithm stops.

In the absence of phase information from the preceding iteration, the first iteration uses a random phase generator 120 to supply phase information 122 as a starting point.

It is found that this algorithm provides convergence on phase distributions in the spatial and Fourier domains which give a good approximation to the sampled image and its Fourier transform.

A known modification of the Gerchberg-Saxton algorithm will now be described with respect to FIG. 2. This algorithm retrieves the phase distribution at the diffraction (Fourier)

plane which gives rise to full wavefront reconstruction of the corresponding image, at an image plane, when illuminated by a suitable light beam and viewed through a Fourier lens (or inverse Fourier transformed).

Figure 2:
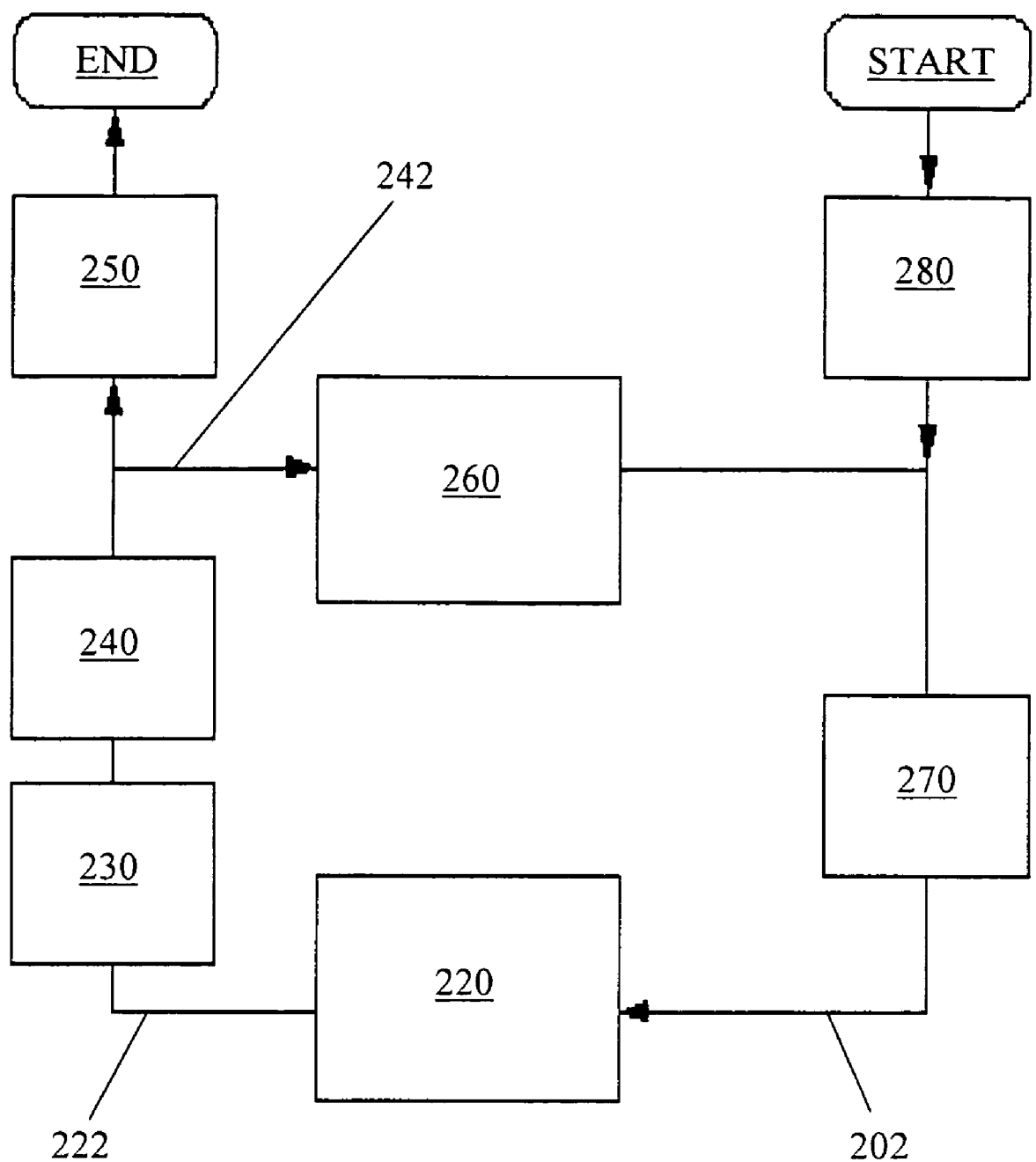
FIG. 2 shows a diagram of a derivative of the Gerchberg-Saxton algorithm.

Referring to FIG. 2, for an $n^{th}$ iteration, the input data set 202 is in the Fourier domain. It consists of amplitude information and phase information. The amplitude information is equal to the amplitude information of the Fourier transform of the target image and the phase information in the frequency domain is from the previous (n−1) iteration. This input data set is inverse Fourier transformed by processing block 220 to produce a second data set 222 in the spatial domain. The amplitude information of the second data set 222 is set to unity by processing block 230 and the phase is quantized by processing block 240 to produce a modified data set 242 having unit magnitude. The modified data set 242 represents a phase distribution that approximates to the Fourier transform of the target image and can be used to reconstruct a phase-only holographic representation of the target image. Modified data set 242 is then Fourier transformed back into the frequency domain in processing block 260 and the phase information output from the block 260 is supplied as an input to processing block 270 which, in turn, supplies the input to the next iteration.

For the first iteration there is no phase information from any preceding iteration, and hence the first iteration uses a random phase generator 280 to supply a starting set of phase information to processing block 270.

With each iteration, the algorithm outputs phase information having a Fourier transform R[x,y] (in the replay field) which is an approximation to T[x;y] (target image). The difference between the replay field and target image gives a measure of convergence of the phase information ψ[x,y] and is assessed by an error function.

Figure 3:
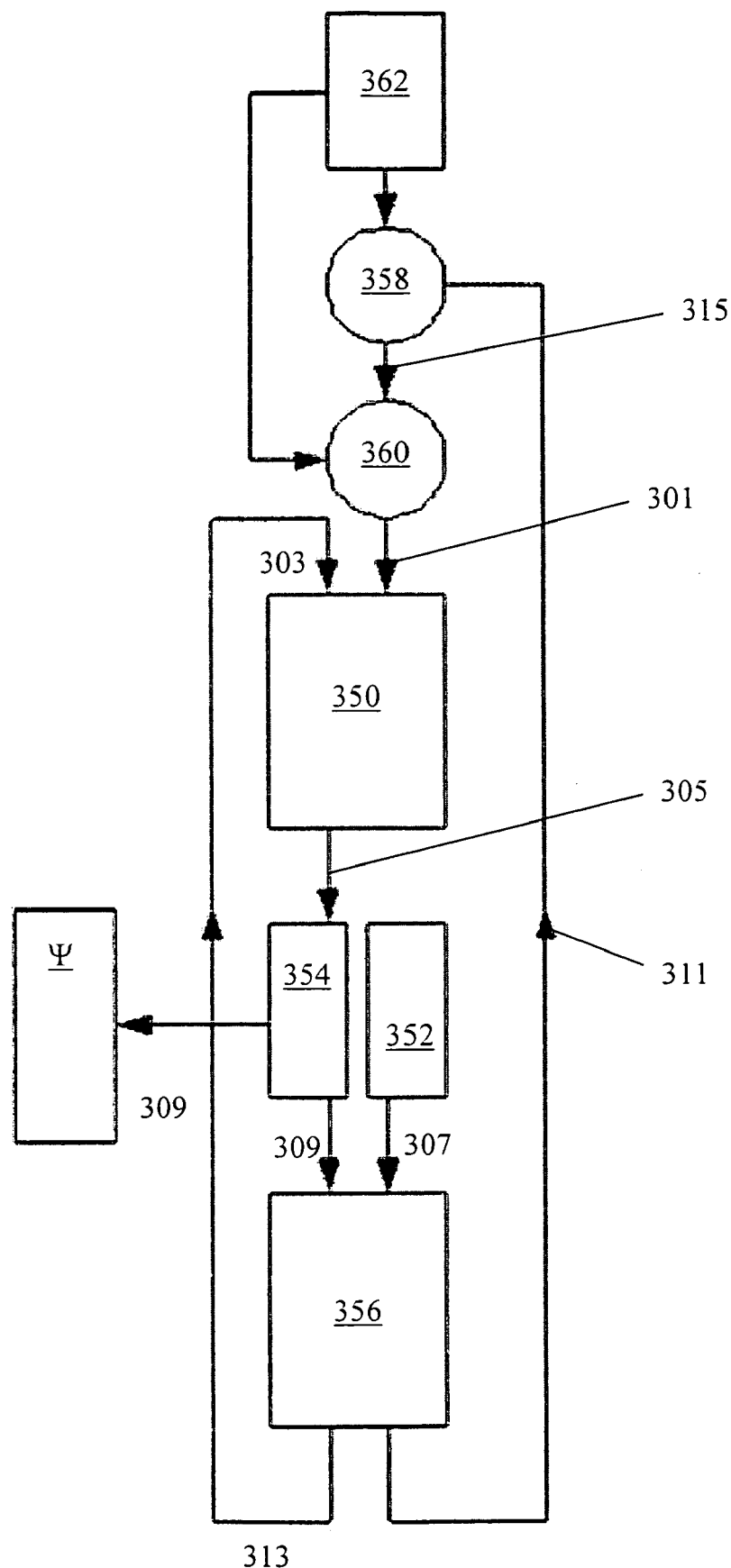
FIG. 3 shows a first algorithm embodying the present invention.

A first embodiment of the present invention is shown in FIG. 3. The figure shows a modified algorithm which retrieves the phase information ψ[x,y] of the Fourier transform of the data set which gives rise to a known amplitude information T[x,y] 362. Amplitude information T[x,y] 362 is representative of a target image (e.g. a photograph). The phase information ψ[x,y] is used to produce a holographic representative of the target image at an image plane.

Since the magnitude and phase are intrinsically combined in the Fourier transform, the transformed magnitude (as well as phase) contains useful information about the accuracy of the calculated data set. Thus, embodiments of the present invention provide the algorithm with feedback on both the amplitude and the phase information.

The algorithm shown in FIG. 3 can be considered as having a complex wave input (having amplitude information 301 and phase information 303) and a complex wave output (also having amplitude information 311 and phase information 313). For the purpose of this description, the amplitude and phase information are considered separately although they are intrinsically combined to form a data set. It should be remembered that both the amplitude and phase information are themselves functions of the spatial coordinates x and y and can be considered amplitude and phase distributions.

Referring to FIG. 3, processing block 350 produces a Fourier transform from a first data set having magnitude information 301 and phase information 303. The result is a second data set, having magnitude information and phase information ψ$_n$[x,y] 305. The amplitude information from processing block 350 is discarded but the phase information ψ$_n$[x,y] 305 is retained. Phase information 305 is quantized by processing block 354 and output as phase information ψ[x,y] 309. Phase information 309 is passed to processing block 356 and given unit magnitude by processing block 352. The third data set 307, 309 is applied to processing block 356 which performs an inverse Fourier transform. This produces a fourth data set R$_n$[x,y] in the spatial domain having amplitude information |R$_n$[x, y]| 311 and phase information ∠R$_n$[x, y] 313.

Starting with the fourth data set, its phase information 313 forms the phase information of a fifth data set, applied as the first data set of the next iteration 303'. Its amplitude information R$_n$[x, y] 311 is modified by subtraction from amplitude information T[x,y] 362 from the target image to produce an amplitude information 315 set. Scaled amplitude information 315 (scaled by α) is subtracted from target amplitude information T[x,y] 362 to produce input amplitude information η[x,y] 301 of the fifth data set for application as first data set to the next iteration. This is expressed mathematically in the following equations:

$$R_{n+1}[x,y] = F'\{\exp(i\psi_n[u,v])\}$$

$$\psi_n[u,v] = \angle F\{\eta^* \exp(i \angle R_n[x,y])\}$$

$$\eta = T[x,y] - \alpha(|R_n[x,y]| - T[x,y])$$

Where:
F' is the inverse Fourier transform;
F is the forward Fourier transform;
R is the replay field;
T is the target image;
∠is the angular information;
Ψ is the quantized version of the angular information;
η is the new target magnitude, η≧0; and
α is a gain element ~1.

In this embodiment, the gain element α is predetermined based on the size and rate of the incoming target image data.

The algorithm shown in FIG. 3 produces phase information ψ[x,y] used to reconstruct a complex wavefront. The complex wavefront gives rise to an accurate holographic representation of target image intensity pattern T[x,y] at a replay field.

Figure 4:
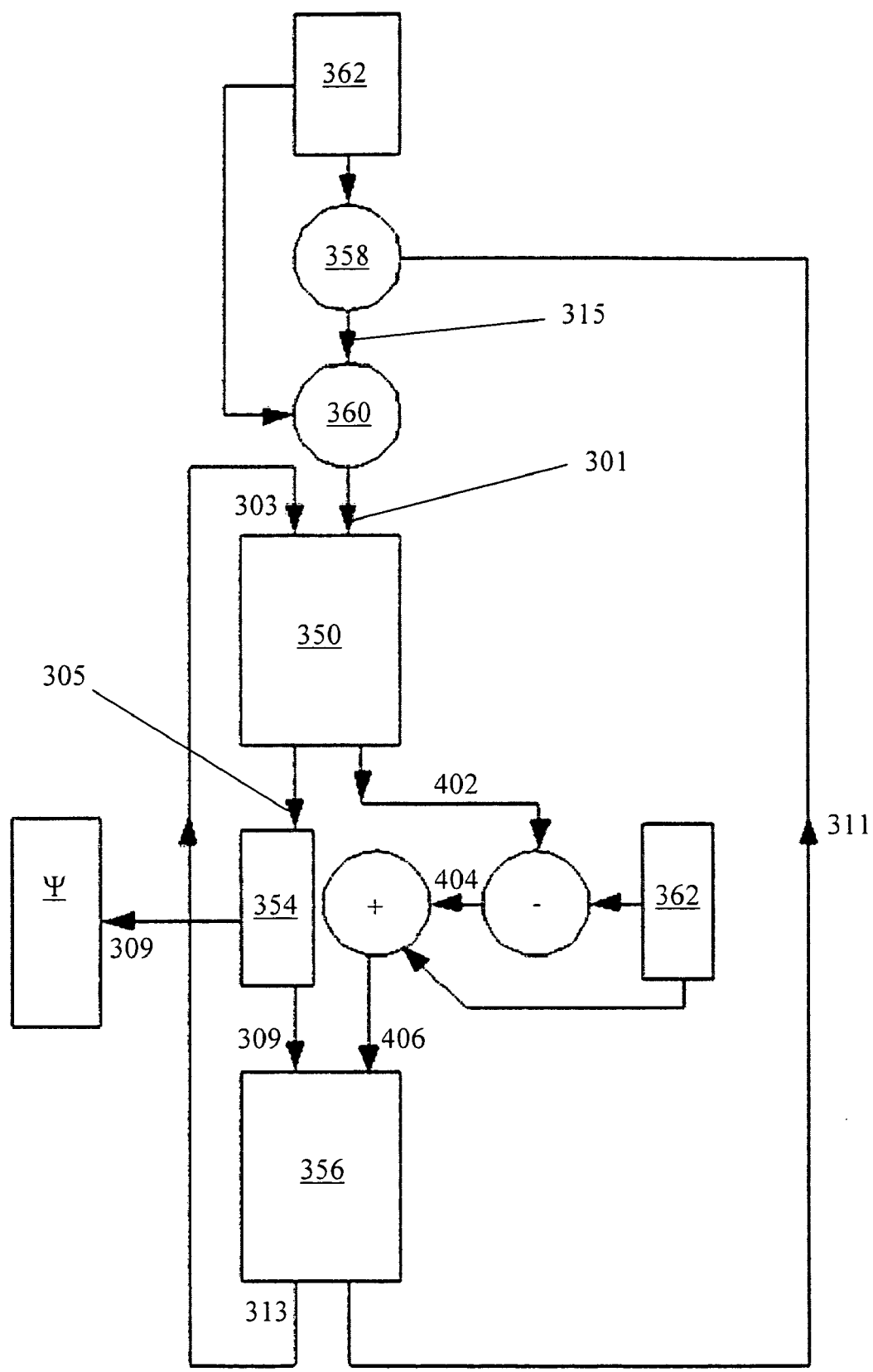
FIG. 4 shows a second algorithm embodying the present invention.

A second embodiment of the present invention is shown in FIG. 4. This embodiment differs from the first in that the resultant amplitude information 402 from processing block 350 is not discarded. The target amplitude information 362 is subtracted from amplitude information 402 to produce a new amplitude information 404. A multiple of amplitude information 404 is subtracted from amplitude information 362 to produce the input amplitude information 406 for processing block 356.

In a third embodiment, the final image reconstruction quality is improved by increasing the number of pixels in the Fourier plane. Since the normal processing method is to use a Fast Fourier Transform (FFT), the number of pixels in the Fourier domain are increased to match the number of pixels in the spatial domain, however target image size will not be increased, with the image being padded with additional data. The same gain feedback method as the first embodiment may be used.

Figure 5:
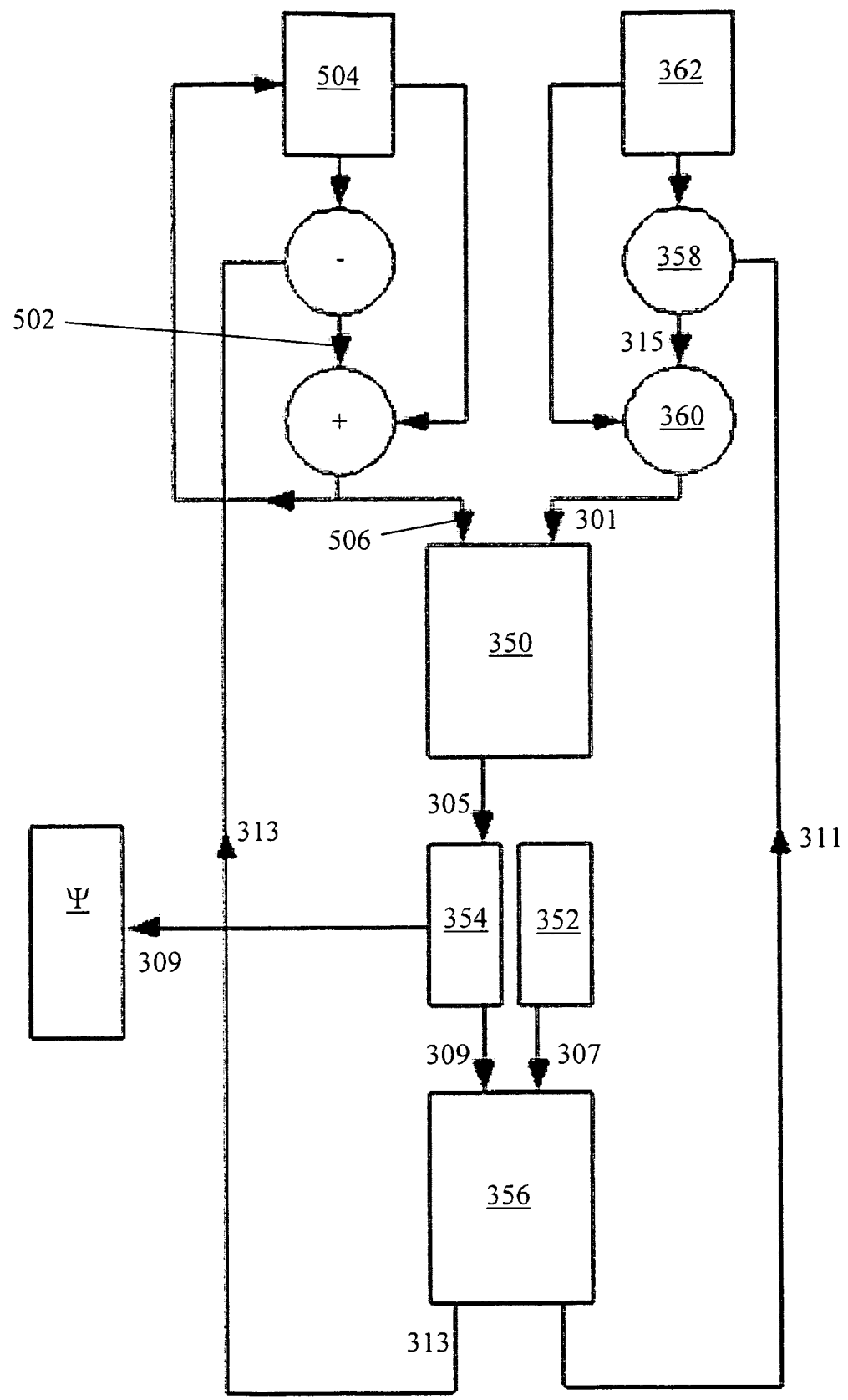
FIG. 5 shows a third algorithm embodying the present invention.

A fourth embodiment of the present invention is shown in FIG. 5. This embodiment is the same as the first except that the phase is not fed back in full and only a portion proportion to its change over the last two iterations is fed back.

The phase information ∠R$_n$[x,y] 313 output by processing block 356 is not fed straight back into processing block 350 as in the first embodiment. The difference between the phase information output in the current 313 and previous 504 iterations (∠R$_n$[x,y]−∠R$_{n-1}$[x,y]) are calculated to give new phase information 502. A multiple, β, of phase information 502 is subtracted from the phase information R$_{n-1}$[x,y] 504 of the previous iteration to give new input phase information 506 which provides the phase input for processing block 350. This may be expressed mathematically in the following equations:

$$R_{n+1}[x,y] = F'\{i\psi_n[u,v]\}$$

$$\psi_n[u,v] = \angle F\{\eta \exp(i\theta)\}$$

$$\eta = T[x,y] - \alpha(|R_n[x,y]| - T[x,y])$$

$$\theta = \angle R_{n-1}[x,y] + \beta(\angle R_n[x,y] - \angle R_{n-1}[x,y])$$

Where:
F' is the inverse Fourier transform;
F if the forward Fourier transform;
R is the replay field;
T is the target image;
$\angle$ is the angular information;
$\Psi$ is the quantized version of the angular information;
$\eta$ is the new target magnitude; $\eta \geq 0$;
$\theta$ is the new phase angle to match the new target magnitude;
$\alpha$ is a gain element ~1; and
$\beta$ is ratio of phase acceptance ~1.

In this way, the algorithm will use the amplitude and phase information to predict the future values of phase. This can significantly reduce the number of iterations required. The gain values $\alpha$ and $\beta$ are chosen to provide optimized speed and quality performance when the algorithm is used to sequentially process a sequence of image frames at conventional video rates.

Embodiments of the present invention may be used to dynamically change the phase pattern on a SLM in response to the output of the algorithm. The algorithms have been optimized to dynamically output phase patterns which produce a sufficient quality holographic representation of a received intensity pattern as perceived by a human viewer. The received intensity patterns may be supplied by a convention video camera. In essence, such a system would comprise: a computer-controlled SLM; video-capture apparatus, such as a video camera and frame-grabber, to provide the source intensity patterns (target images); the phase-retrieval algorithm as described in the above embodiments; and a suitably-chosen light source for illuminating the SLM and reconstructing the holographic image.

The skilled person will appreciate that the algorithm is not sensitive to the source of the input target images, only the rate at which images are received. The algorithm is optimized to output phase patterns on the SLM leading to dynamic holographic image of "acceptable" quality, time-correlated with the input intensity patterns. Embodiments of the present invention make the optimum trade-off between the quality of holographic images and the speed at which an "acceptable" quality holographic image is produced for series of input intensity patterns arriving at conventional video rates, for example 50 or 60 Hz).

Embodiments of the present invention are suitable for producing real-time phase patterns on a SLM for purposes other than real-time holography. For example, the SLM may be dynamically modified using calculations from the algorithm, using any of the described embodiments, to redirect incoming EM waves in a predetermined direction. This may be useful in applications where it is advantageous to redirect arbitrary RF waves in specific directions such as towards particular antenna.

The gain factors $\alpha$ and $\beta$ may be fixed values or dynamically changing with time in a predetermined manner or in response to the rate of convergence, for example.

Some embodiments of the present invention may sufficiently converge on a phase information in fewer iterations than other embodiments but the time taken to converge may increase owing to the greater computational time required for each iteration.

Embodiments of the present invention are particularly suitable for phase retrieval of MPEGs since this video format only records changes in the image from frame to frame and the feedback factor $|R_n[x,y]| - T[x,y]$ necessitates this calculation. Thus, computation time may be saved in the phase retrieval if this calculation has already been made.

Embodiments of the present invention find application in small projectors and head-up displays.

Embodiments may provide phase information at high rates—for example more than one image per frame rate, e.g. to allow for grey scale reproduction, or color reproduction.

The invention has now been described with reference to a number of embodiments thereof. The invention is not however to be restricted to features of the described embodiments.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of retrieving phase information from input intensity information, representative of a target image, comprising iterating the following steps:
   establishing a first data set having plural elements, each element having phase information and amplitude information, the amplitude information being derived from the input intensity information;
   performing a Fourier transform on the first data set to produce a second data set having plural elements, each element having amplitude and phase information; quantising and storing phase information from the second data set in memory;
   forming a third data set having plural elements, each element having amplitude and phase information, the phase information being derived from the second data set;
   inverse Fourier transforming the third data set to produce a fourth data set having plural elements, each element having amplitude and phase information;
   modifying the fourth data set by input data to produce a fifth data set having plural elements, each element having amplitude and phase information;
   using the fifth data set as the first data set of a subsequent iteration;
   the method further comprising forming the difference between the amplitude information of the second data set and the target image, and setting the amplitude information of the third data set to be scaled to said difference.

2. The method of claim 1, comprising using the phase information of the fifth data set for an $n^{th}$ iteration as the phase information of the first data set for the (n+1)th iteration.

3. The method of claim 1, wherein the amplitude information of the first data set for an (n+1)th iteration is a scaled form of difference between target image intensity information and amplitude information of the fifth data set for the nth iteration.

4. The method of claim 1, comprising setting the amplitude information of the third data set to unity.

5. The method of claim 1, comprising generating random phase information as the first data set for the first iteration.

6. The method of claim 1, wherein the input intensity data changes with time.

7. The method of claim 6, comprising completing at least one iteration before the input intensity data changes.

8. A method for real-time holographic projection comprising:
   receiving a temporal series of intensity information items (frames); retrieving phase information of a far-field diffraction pattern of each frame or target image by an iterative method using proportional-control feedback, using a method according to claim 1;
   outputting the phase information to a spatial light modulator;
   continuously illuminating the spatial light modulator with a collimated light source; and
   collecting and focusing phase modified light reflected off or transmitted through the spatial light modulator to produce a holographic replay field.

9. A method of projection as claimed in claim 8, comprising receiving the series of frames at conventional video rates.

10. A method of projection as claimed in claim 8, wherein the feedback is a data set containing amplitude and phase information.

11. A method of projection as claimed in claim 10, comprising optimising feedback data such that sufficient iterations of the phase information calculations are completed in the time between frames so as to give rise to a dynamic holographic representation of the target images which can be recognised by a human viewer as representative of the series of target images.

12. A method of projection as claimed in claim 8, comprising padding the periphery of output phase information with zeros.

13. A method of projection as claimed in claim 8, comprising updating the spatial light modulator with phase information data at an update rate equal to or greater than a rate of reception of incoming frames.

14. An apparatus for producing real-time holographic representations of an input target image intensity information comprising:
   means for receiving a temporal series of target image intensity information items; processing means implementing the method of claim 1, whereby the phase information is retrieved for each target image;
   a spatial light modulator;
   a collimated light source disposed to illuminate the spatial light modulator; and
   lensing-means disposed to reproduce the representation on a screen.

15. The apparatus of claim 14, wherein the receiving and processing means allow retrieval of the phase information of an input target image within the interval between successive target images.

16. The apparatus of claim 14, wherein the spatial light modulator has a plurality of transparent elements.

17. The apparatus of claim 16, wherein each element changes the phase of a light wave passes through the element to a predetermined phase information.

18. The apparatus of claim 17, wherein the phase change of each element is independent on the phase change of the other elements.

19. The apparatus of claim 16, wherein the plurality of elements produce a phase information indicative of the phase information retrieved by the processing means.

20. A method of retrieving phase information from input intensity information, representative of a target image, comprising iterating the following steps:
   establishing a first data set having plural elements, each element having phase information and amplitude information, the amplitude information being derived from the input intensity information;
   performing a Fourier transform on the first data set to produce a second data set having plural elements, each element having amplitude and phase information; quantising and storing phase information from the second data set in memory;
   forming a third data set having plural elements, each element having amplitude and phase information, the phase information being derived from the second data set and inverse Fourier transforming the third data set to produce a fourth data set having plural elements, each element having amplitude and phase information;
   modifying the fourth data set by input data to produce a fifth data set having plural elements, each element having amplitude and phase information;
   using the fifth data set as the first data set of a subsequent iteration; and
   storing phase information of the fifth data set in memory for use in a succeeding iteration, wherein a phase information of the first data set for an nth iteration is a scaled form of the difference between the phase information of the fourth data set for the (n−1) and the (n−2) iterations.

21. The method of claim 20, further comprising using the phase information of the fifth data set for an $n^{th}$ iteration as the phase information of the first data set for the (n+1)th iteration.

22. The method of claim 20, wherein the amplitude information of the first data set for an (n+1)th iteration is a scaled form of difference between target image intensity information and amplitude information of the fifth data set for the nth iteration.

23. The method of claim 20, further comprising setting the amplitude information of the third data set to unity.

24. The method of claim 20, further comprising generating random phase information as the first data set for the first iteration.

25. The method of claim 20, wherein the input intensity data changes with time.

26. The method of claim 25, further comprising completing at least one iteration before the input intensity data changes.

27. A method for real-time holographic projection comprising:
   receiving a temporal series of intensity information items (frames);
   retrieving phase information of a far-field diffraction pattern of each frame or target image by an iterative method using proportional-control feedback, using a method according to claim 20;
   outputting the phase information to a spatial light modulator;
   continuously illuminating the spatial light modulator with a collimated light source; and
   collecting and focusing phase modified light reflected off or transmitted through the spatial light modulator to produce a holographic replay field.

28. A method of projection as claimed in claim 27, further comprising receiving the series of frames at conventional video rates.

29. A method of projection as claimed in claim 27, wherein the feedback is a data set containing amplitude and phase information.

30. A method of projection as claimed in claim 29, further comprising optimising feedback data such that sufficient iterations of the phase information calculations are completed in the time between frames so as to give rise to a dynamic holographic representation of the target images which can be recognised by a human viewer as representative of the series of target images.

31. A method of projection as claimed in claim 27, further comprising padding the periphery of output phase information with zeros.

32. A method of projection as claimed in claim 27, further comprising updating the spatial light modulator with phase information data at an update rate equal to or greater than a rate of reception of incoming frames.

33. An apparatus for producing real-time holographic representations of input target image intensity information, the apparatus comprising:
   means for receiving a temporal series of target image intensity information items;
   processing means implementing the method of claim 20, whereby the phase information is retrieved for each target image;
   a spatial light modulator;
   a collimated light source disposed to illuminate the spatial light modulator; and
   lensing-means disposed to reproduce the representation on a screen.

34. The apparatus of claim 33, wherein the receiving and processing means allow retrieval of the phase information of an input target image within the interval between successive target images.

35. The apparatus of claim 33, wherein the spatial light modulator has a plurality of transparent elements.

36. The apparatus of claim 35, wherein each element changes the phase of a light wave that passes through the element to a predetermined phase information.

37. The apparatus of claim 36, wherein the phase change of each element is independent of the phase change of the other elements.

38. The apparatus of claim 35, wherein the plurality of elements produce phase information indicative of the phase information retrieved by the processing means.

* * * * *